US012427741B2

(12) United States Patent
Faivre D'arcier et al.

(10) Patent No.: US 12,427,741 B2
(45) Date of Patent: Sep. 30, 2025

(54) PROPELLER BLADE OR AIRFOIL WITH WOUND COMPOSITE ROOT

(71) Applicants: SAFRAN, Paris (FR); SAFRAN AIRCRAFT ENGINES, Paris (FR)

(72) Inventors: Pierre Jean Faivre D'arcier, Moissy Cramayel (FR); Clément Pierre Postec, Moissy Cramayel (FR); François Charleux, Moissy Cramayel (FR); Mattéo Minervino, Moissy Cramayel (FR)

(73) Assignees: SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/860,295

(22) PCT Filed: Apr. 20, 2023

(86) PCT No.: PCT/FR2023/050566
§ 371 (c)(1),
(2) Date: Oct. 25, 2024

(87) PCT Pub. No.: WO2023/209312
PCT Pub. Date: Nov. 2, 2023

(65) Prior Publication Data
US 2025/0108579 A1     Apr. 3, 2025

(30) Foreign Application Priority Data
Apr. 26, 2022   (FR) ..................... 2203867

(51) Int. Cl.
*F01D 5/28* (2006.01)
*B29B 11/16* (2006.01)
*B29D 99/00* (2010.01)

(52) U.S. Cl.
CPC .......... *B29D 99/0025* (2013.01); *B29B 11/16* (2013.01)

(58) Field of Classification Search
CPC ........................... F01D 5/282; B29D 99/0025
See application file for complete search history.

(56) References Cited

U.S. PATENT DOCUMENTS 9,162,750 B2 *  10/2015  Coupe ..................... B64C 11/26
2006/0257260 A1  11/2006  Dambrine et al.
(Continued)

FOREIGN PATENT DOCUMENTS

| FR | 3 080 322 A1 | 10/2019 |
| FR | 3 106 364 A1 | 7/2021 |
| WO | WO 2006/136755 A2 | 12/2006 |

OTHER PUBLICATIONS

Written Opinion of the International Searching Authority as issued in International Patent Application No. PCT/FR2023/050566, dated Aug. 1, 2023.
(Continued)

*Primary Examiner* — Michael L Sehn
(74) *Attorney, Agent, or Firm* — Pillsbury Winthrop Shaw Pittman LLP (57) ABSTRACT

A turboprop engine blade or propeller airfoil made of composite material includes a fiber reinforcement densified by a matrix, the blade or propeller airfoil including along a longitudinal direction a root and an aerodynamic profile. The fiber reinforcement includes a fiber preform having a three-dimensional weave with a root preform part located in the root and an aerodynamic profile part located in the aerodynamic profile, the root preform and aerodynamic profile parts being connected to one another by three-dimensional weaving. The root preform part includes two woven skins wound around an insertion element.

9 Claims, 6 Drawing Sheets

(56) References Cited

U.S. PATENT DOCUMENTS

2013/0017093 A1    1/2013  Coupe et al.
2019/0217943 A1*   7/2019  Courtier .............. B29C 70/545

OTHER PUBLICATIONS

International Search Report as issued in International Patent Application No. PCT/FR2023/050566, dated Aug. 1, 2023.
First Office Action as issued in Chinese Patent Application No. 202380038993.9, dated Feb. 8, 2025.

* cited by examiner

PROPELLER BLADE OR AIRFOIL WITH WOUND COMPOSITE ROOT

CROSS-REFERENCE TO RELATED APPLICATIONS

This application is the U.S. National Stage of PCT/FR2023/050566, filed Apr. 20, 2023, which in turn claims priority to French patent application number 2203867 filed Apr. 26, 2022. The content of these applications are incorporated herein by reference in their entireties.

TECHNICAL FIELD

This invention relates to the field of aircraft blades or propeller airfoils such as those found on turboprop engines.

PRIOR ART

Blades or airfoils for turboprop engines are generally made of metallic material. While blades or propeller airfoils made of metallic material have good mechanical resistance, they have the drawback of having a relatively large mass.

To obtain lighter blades or propeller airfoils, it is known to produce propeller airfoils made of composite material, i.e. by producing structural parts with fiber reinforcements densified by a matrix.

Document US 2013/0017093 describes the production of a propeller airfoil based on a fiber structure with an aerodynamic profile into which a part of a spur is inserted, one end of the spur being extended by an inflated portion intended to form the root of the propeller airfoil.

The new generation of engines require more compact blade or airfoil roots. This requirement stems from the need to be able to pivot the blade or the airfoil about its vertical axis to adapt its incidence to the flight rating (variable-pitch blade or airfoil). This need, combined with the fact that the blade or airfoil must be incorporated as low as possible on the disc, makes it possible to greatly reduce the bulk of the root.

For this purpose, the roots of new-generation blades or airfoils have an axisymmetric or substantially axisymmetric shape and reduced dimensions, unlike the roots of the prior art such as those described in document US 2013/0017093 which extend over the entire length of the lower part of the blade or airfoil.

This axisymmetric or quasi-axisymmetric shape is more difficult to manufacture as a composite material, in particular when three-dimensional (3D) weaving is used to form the fiber reinforcement of the blade or airfoil.

Moreover, the mechanical loads to which new-generation roots are subjected impose additional stresses. Specifically, besides the mechanical tensile and bending loads usually encountered (caused by centrifugal forces and impacts with objects respectively), new-generation roots can be incorporated into the rotor disc using metallic shells, which causes an additional mechanical circumferential compression load.

SUMMARY OF THE INVENTION

It is therefore desirable to be able to make provision for a solution for the production of aircraft blades or propeller airfoils made of composite materials with a compact root and able to resist the different mechanical loads.

For this purpose, this invention makes provision for a method for manufacturing a turboprop engine blade or propeller airfoil made of composite material comprising a fiber reinforcement densified by a matrix, the method comprising:

the production by three-dimensional weaving of a fiber blank made as a single piece, the fiber blank having a flat shape extending along a longitudinal direction and a transverse direction respectively corresponding to the span direction and to the chord direction of the blade or propeller airfoil to be manufactured, the fiber blank comprising a root part and an aerodynamic profile part extending along the longitudinal direction from its root part and along the transverse direction between a leading edge portion and a trailing edge portion, the shaping of the fiber blank to obtain a fiber preform as a single piece having said aerodynamic profile part forming an aerodynamic profile preform and said root part forming a root preform, and the densification of the preform by a matrix to obtain a blade or propeller airfoil made of composite material having a fiber reinforcement consisting of the fiber preform and densified by the matrix, and forming a single piece with an integrated root, characterized in that the root part of the fiber blank comprises a non-interlinking extending along a plane parallel to the surface of the fiber blank over the whole root part, said non-interlinking separating the root part into two woven portions and in that the shaping of the fiber blank comprises the winding of each woven portion around an insertion element in such a way as to form a root preform part.

The method of the invention thus makes it possible to produce a propeller airfoil or blade with a composite root which is at once compact and perfectly suitable for resisting the different mechanical loads previously described. Specifically, the fiber reinforcement part of the root is made using 3D weaving and has a wound shape which is connected to the fiber reinforcement part of the aerodynamic profile at its center. One thus obtains a much more compact composite root than that of the prior art which generally extends over the entire width of the lower part of the aerodynamic profile. In this composite root, there are yarns, for example warp yarns, oriented in the span direction of the airfoil or blade, which gives this airfoil or blade a good mechanical tensile and bending resistance when combined with 3D weaving. Furthermore, in the composite root, there are yarns, for example weft yarns, oriented in the chord direction of the airfoil or blade which gives this airfoil or blade good mechanical resistance under circumferential compression.

Moreover, the winding of the woven portions around an insertion element makes it possible to obtain a root having an axisymmetric or quasi-axisymmetric shape compatible with incorporation into a propeller rotation or pitch change system.

By thus producing a fiber reinforcement in which a root part is integrally formed, i.e. woven as a single piece, with an aerodynamic profile part, a very good mechanical withstand is ensured in the whole piece and, in particular, at the connection between the root and the aerodynamic profile.

According to an aspect of the method of the invention, each woven portion comprises a first part extending along the longitudinal direction from the aerodynamic profile part and a second part extending along the longitudinal direction from the first part, the second part having, along the transverse direction, a width greater than the width of the first part. The second part of each woven portion has, along the transverse direction, a width equivalent to at least half of the circumference of the part of the insertion element around which said second part of each woven portion is wound.

According to another aspect of the method of the invention, the insertion element is composed of a fiber material chosen from among one of the following fiber materials: three-dimensional weaves, unidirectional laminates and fiber mat, or is composed of a metallic material.

The invention also has as subject a turboprop engine blade or propeller airfoil made of composite material comprising a fiber reinforcement densified by a matrix, the blade or propeller airfoil including, along a longitudinal direction, a root and an aerodynamic profile, the fiber reinforcement comprising a fiber preform having a three-dimensional weave with a root preform part located in the root and an aerodynamic profile part located in the aerodynamic profile, the root and aerodynamic profile preform parts being connected to one another by three-dimensional weaving, characterized in that the root preform part comprises two woven skins wound around an insertion element.

According to an aspect of the blade or propeller airfoil of the invention, each skin comprises a first part extending along the longitudinal direction from the aerodynamic profile preform part and a second part extending along the longitudinal direction from the first part, the second part of each skin being wound around at least half of the circumference of the part of the insertion element around which said second part of each woven portion is wound.

According to another aspect of the blade or propeller airfoil of the invention, the insertion element is composed of a fiber material chosen from among the following fiber materials: three-dimensional weaves, unidirectional laminates and fiber mat, or is composed of a metallic material.

The invention furthermore covers an aeronautical engine comprising a plurality of blades or propeller airfoils according to the invention along with an aircraft comprising at least one such engine.

DESCRIPTION OF THE EMBODIMENTS

The invention is generally applicable to different types of blades or propeller airfoils used in aircraft engines. The invention has an advantageous but non-exclusive application in blades or propeller airfoils of large dimensions which are intended to be incorporated into pivot or variable-pitch systems. Such blades or propeller airfoils are generally equipped with a root having both a small bulk (compact shape) and a good resistance to tensile, bending and circumferential compression forces. The blade according to the invention can in particular form a blade for ducted impellers such as fan blades or a blade for unducted impellers as in "open rotor" aeronautical engines.

In the remainder of the description, the exemplary embodiments are described in relation to blades for turboprop engines. However, the exemplary embodiments are also applicable to propeller airfoils for aircraft.

Figure 1:
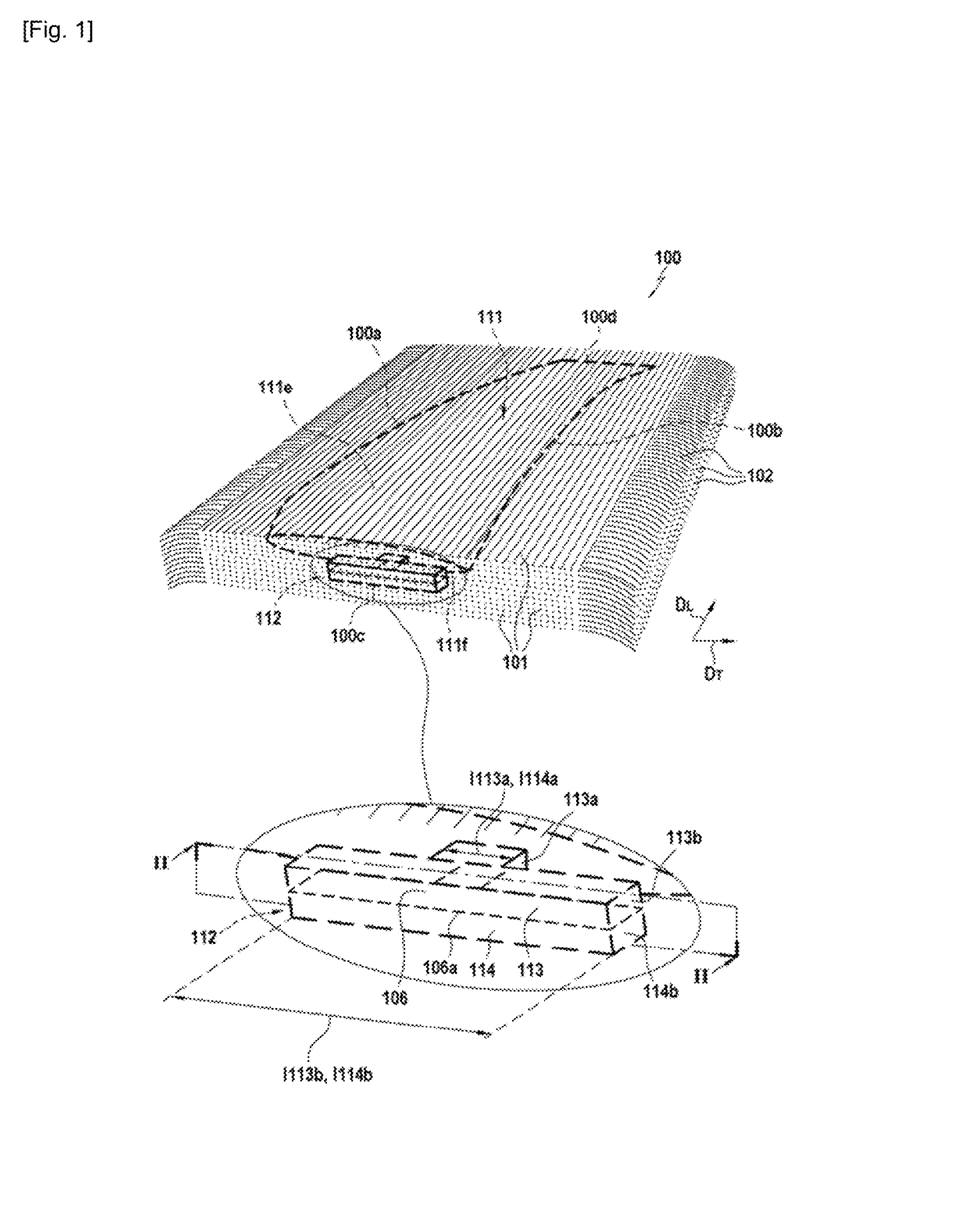
FIG. 1 is a schematic view illustrating the 3D weaving of a fiber blank for manufacturing a blade.

FIG. 1 very schematically represents a fiber blank 100 intended to shape the fiber preform of a blade to be produced.

The fiber structure blank 100 is obtained, as schematically illustrated on FIG. 1, by three-dimensional (3D) weaving done in a known manner by means of a Jacquard loom on which has been arranged a bundle of warp yarns 101 or strands made of a plurality of layers of several hundred yarns each, the warp yarns being connected by weft yarns 102. The fiber structure blank 100 is woven as a single piece, the blank extending in a longitudinal direction DL, corresponding to the span direction of the blade to be manufactured, between a lower part 100c and an upper part 100d, and in a transverse direction $D_T$, corresponding to the chord direction of the blade to be manufactured between a front edge 100a and a rear edge 100b, the blank comprising an aerodynamic profile part 111 defining two faces 111e and 111f intended to respectively form the suction and pressure faces of the blade and a root part 112 intended to subsequently form a blade root and extending outside the aerodynamic profile blank 111 along the longitudinal direction DL and in recess from the front and rear edges 100a and 100b along the transverse direction $D_T$.

In the illustrated example, the 3D weaving is weaving with an "interlock" weave. The term "interlock" weave should here be understood to mean a weave in which each layer of weft yarns links several layers of warp yarns with all of the yarns in the same weft column having the same movement in the weave plane.

Other known types of three-dimensional weaving may be used, such as in particular those described in document WO 2006/136755. This document in particular describes the production by weaving, as a single piece, of fiber reinforcement structures for pieces such as blades having a first type of weave at the core and a second type of weave at the skin, making it possible to give this type of piece both the desired mechanical and aerodynamic properties.

The fiber blank according to the invention can in particular be woven from carbon or ceramic fiber yarns such as silicon carbide.

Gradually as the fiber blank of varying thickness and width is woven, a certain number of warp yarns are not woven, which makes it possible to define the desired contour and thickness, continuously variable, of the blank 100. An example of variable 3D weaving in particular making it possible to vary the thickness of the blank between a first edge intended to form the leading edge and a second edge of a lesser thickness and intended to form the trailing edge is described in the document US 2006/257260.

In accordance with the invention, during the weaving, a non-interlinking 106 is made inside the root part 112 of the fiber blank 100 between two successive layers of warp yarns. The non-interlinking 106 extends along a plane parallel to the surface of the fiber blank and over the entire surface of the root part 112 in such a way as to separate it into two woven portions 113 and 114.

Figure 2:
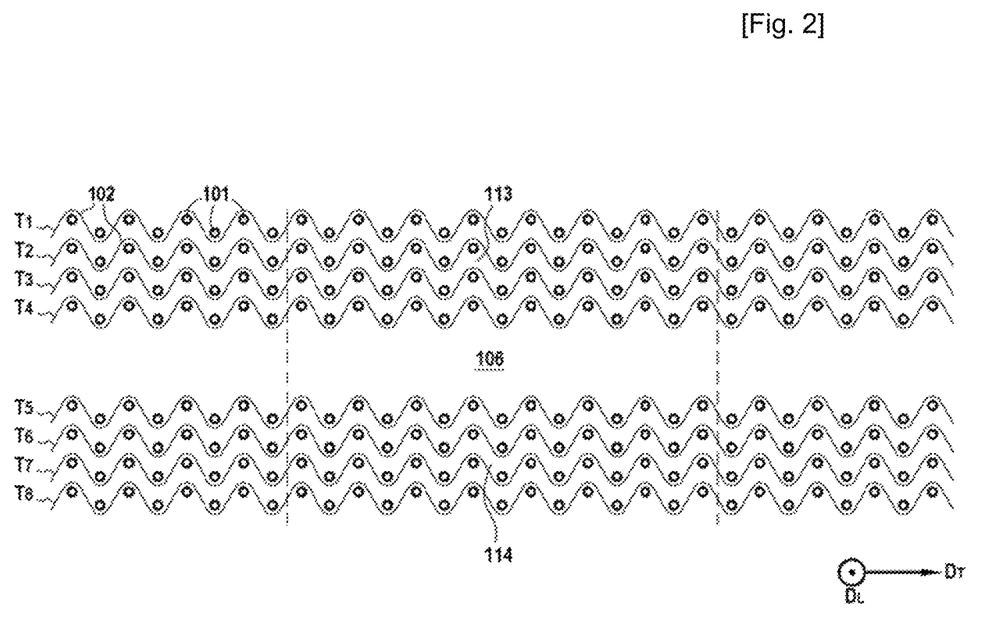
FIG. 2 is a weft-direction section view on a magnified scale of an assembly of layers of yarns showing the formation of two non-interlinkings in the root part of the blank of FIG. 1 along a section plane II-II.

A mode of 3D weaving of the blank 100 using an interlock weave is schematically represented by FIG. 2. FIG. 2 is a magnified partial view of a warp section plane in the root part 112 of the blank 100 including the non-interlinking 106 (section II-II on FIG. 1). In this example, the blank 100 comprises eight layers of warp yarns 101 extending substantially in the longitudinal direction $D_L$, the non-interlinking 106 separating the eight layers of warp yarns into two groups of four layers of warp yarns. More precisely, on FIG. 2, the woven portion 113 comprises four layers of warp yarns 101 interlinked by four weft yarns $T_1$ to $T_4$ while the woven portion 114 comprises four layers of warp yarns interlinked by four weft yarns $T_5$ and $T_8$.

In other words, the fact that the weft yarns $T_1$ to $T_4$ do not extend into the layers of warp yarns of the woven portion 114 and the weft yarns $T_5$ to $T_8$ do not extend into the layers of warp yarns of the woven portion 113 ensures the non-interlinking 106 which separates the woven portions 113 and 114.

In the example described here, the root part 112 has an inverted T shape. More precisely, the woven portion 113, and respectively 114, comprises a first part 113a, respectively 114a, extending along the longitudinal direction DL from the aerodynamic profile part 111 and a second part 113b, respectively 114b, extending along the longitudinal direction from the first part 113a, respectively 114a, the second part 113b, respectively 114b, having along the transverse direction $D_T$ a width $I_{113b}$, respectively $I_{114b}$, greater than the width $I_{113a}$, respectively $I_{114a}$, of the first part 113a, respectively 114a. The second part 113b, respectively 114b, of the woven portion 113, respectively 114, has along the transverse direction $D_T$ a width $I_{113b}$, respectively $I_{114b}$, equivalent to at least half of the circumference of the insertion element part around which said second part is intended to be wound.

Once the weaving is finished, the unwoven yarns located around the fiber blank 100 are cut to extract the blank, then the shaping of the root part of the blank is carried out. In the example described here, the shaping of the root part 112 is done by winding of the woven portions 113 and 114 around an insertion element 130 as illustrated on FIG. 3. The insertion element or at least the part of the insertion element around which the woven portions are intended to be wound preferably has an axisymmetric or substantially axisymmetric shape in order to form a compact root that is easy to integrate into a propeller rotation or pitch change system.

Figure 3:
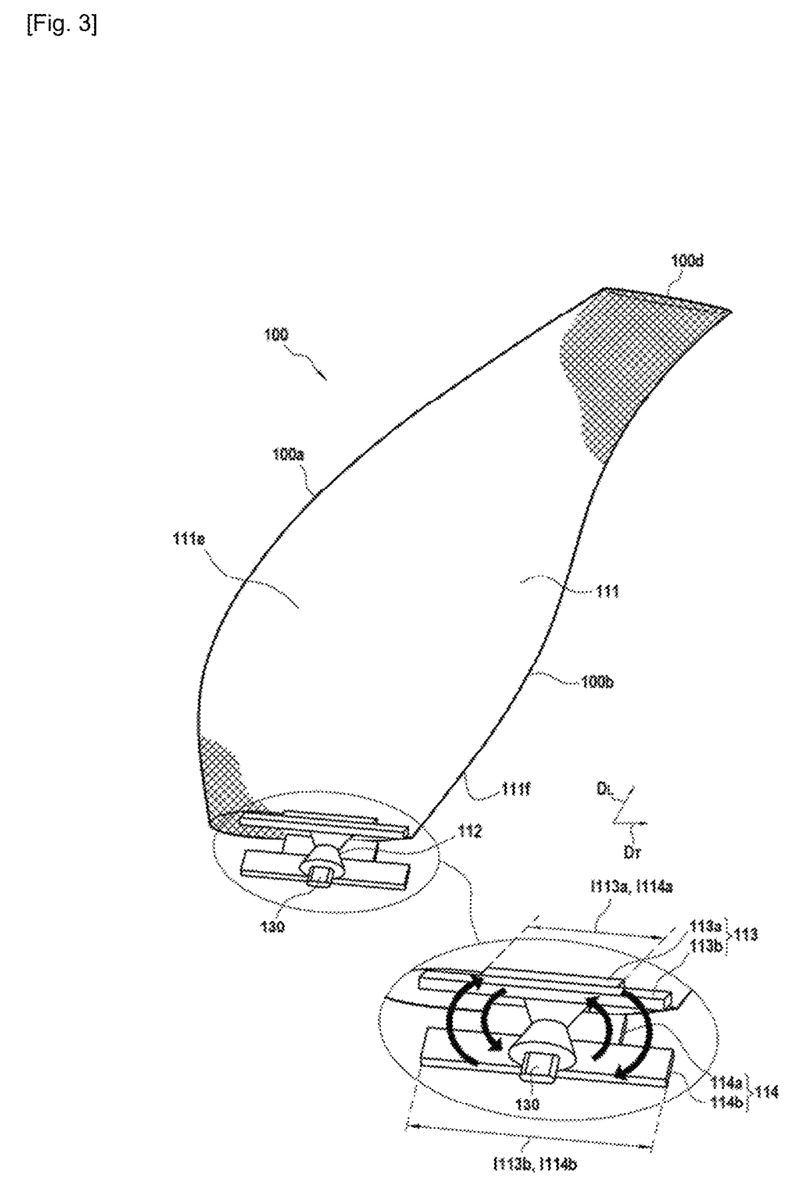
FIG. 3 is a perspective view showing the shaping of a root preform part in the fiber blank of FIG. 1.

Depending on the width of the second parts 113b and 114b of the woven portions 113 and 114, each of these woven portions can be wound over half of the circumference of the insertion element, over the entire circumference of the insertion element or over several times the circumference of the insertion element. In the example described here, the second part 113b, respectively 114b, of the woven portion 113, respectively 114, has along the transverse direction $D_T$ a width $I_{113b}$, respectively $I_{114b}$, equivalent to half of the circumference of the part of the insertion element around which said second part is intended to be wound.

Figure 4:
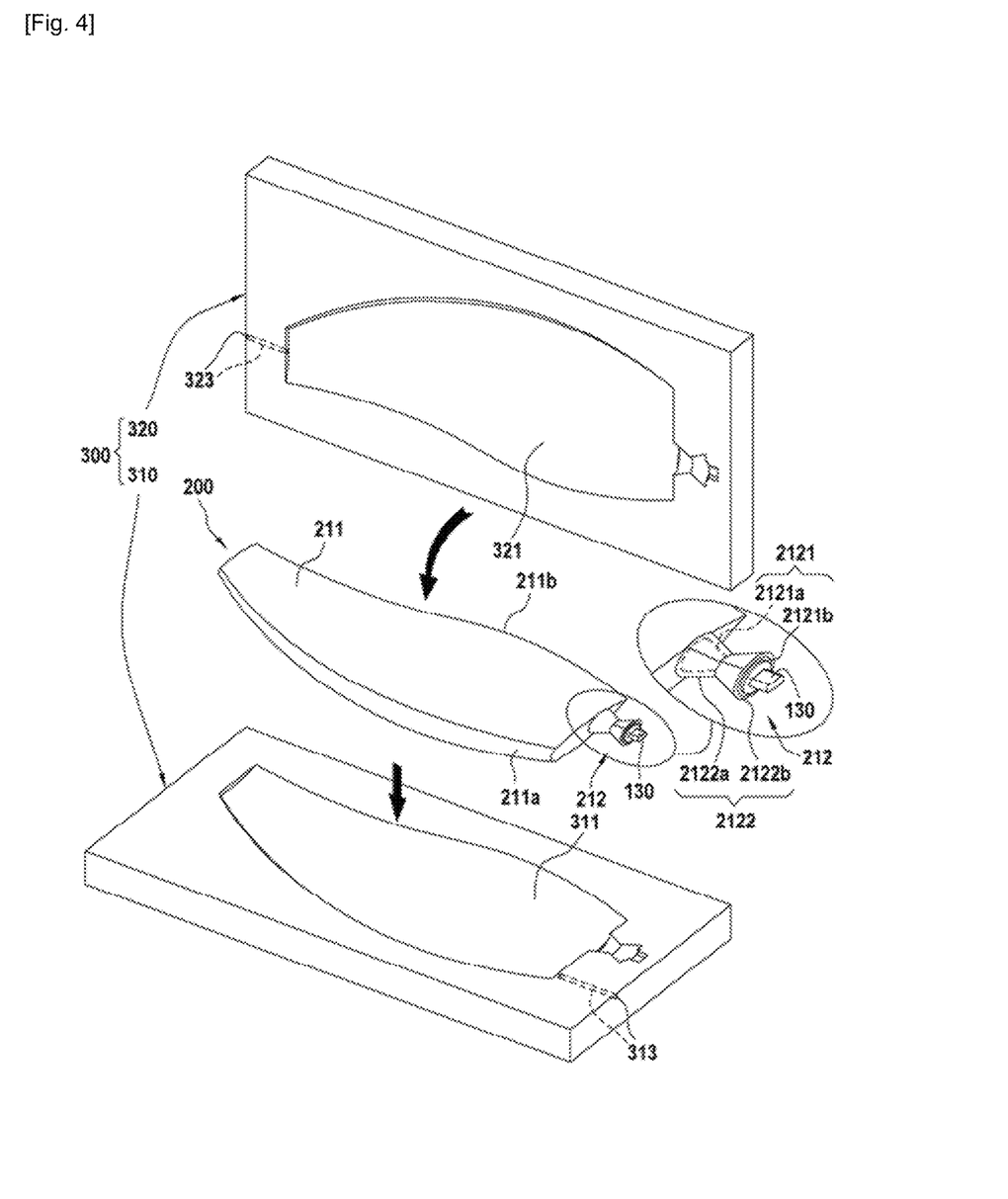
FIG. 4 is an exploded schematic perspective view showing an injection tool and the placing of the fiber preform of FIG. 3 inside it in accordance with an embodiment of the invention.

One thus obtains a fiber preform 200 comprising along the longitudinal direction DL an aerodynamic profile preform part 211 and a root preform part 212 having a bulb shape as shown on FIG. 4. The root preform part 212 comprises two skins 2121 and 2122 wound around the insertion element 130 with first skin parts 2121a and 2122a forming a half-turn around the insertion element and second skin parts 2121b and 2122b forming a full turn around the insertion element. The aerodynamic profile preform part 211 extends along the transverse direction $D_T$ between a leading edge part 211a and a trailing edge part 211b.

The densification of the fiber preform is then carried out. The densification of the fiber preform intended to form the fiber reinforcement of the piece to be manufactured consists in filling the void of the preform, in all or part of the volume of that preform, with the material constituting the matrix. This densification is done in a manner known per se following the liquid technique (CVL). The liquid technique consists in impregnating the preform with a liquid blend containing a precursor of the material of the matrix. The precursor usually takes the form of a polymer, such as a high-performance epoxy resin, where applicable diluted in a solvent. The preform is placed in a mold that can be closed in a sealed manner with a housing having the shape of the molded final part. Next, the mold is closed again and the liquid matrix precursor (for example a resin) is injected into the entire housing to pre-impregnate the entire fiber part of the preform.

The transformation of the matrix precursor, namely its polymerization, is done by heat treatment, generally by heating the mold, after eliminating any solvent and cross-linking the polymer, the preform still being kept in the mold with a shape equivalent to that of the piece to be produced.

If forming a carbon or ceramic matrix, the heat treatment consists in pyrolyzing the precursor to transform the matrix into a carbon or ceramic matrix according to the precursor used and the pyrolysis conditions. By way of example, ceramic liquid precursors, particularly of SiC, can be resins of polycarbosilane (PCS) or polytitanocarbosilane (PTCS) or polysilazane (PSZ) type, while carbon liquid precursors can be resins with relatively high coke rates, such as phenol resins. Several consecutive cycles, from impregnation to heat treatment, can be carried out to achieve the desired degree of densification.

According to an aspect of the invention, particularly if forming an organic matrix, the densification of the fiber preform can be done via the well-known step of RTM (Resin Transfer Molding). In accordance with the RTM process, the fiber preform is placed in a mold having the outer shape of the piece to be produced. A thermosetting resin is injected into the inner space of the mold comprising the fiber preform. A pressure gradient is generally established in this inner space between the place where the resin is injected and the evacuation orifices of this latter in order to control and optimize the impregnation of the preform by the resin.

As illustrated in FIG. 4, the injection of a liquid matrix precursor blend along with the fiber texture along with its transformation into a matrix are here done in an injection tool 300 which comprises a first shell 310 comprising at its center a first cavity 311 corresponding in part to the shape and dimensions of the blade to be produced and a second shell 320 comprising at its center a second cavity 321 corresponding in part to the shape and dimensions of the blade to be produced.

Figure 5:
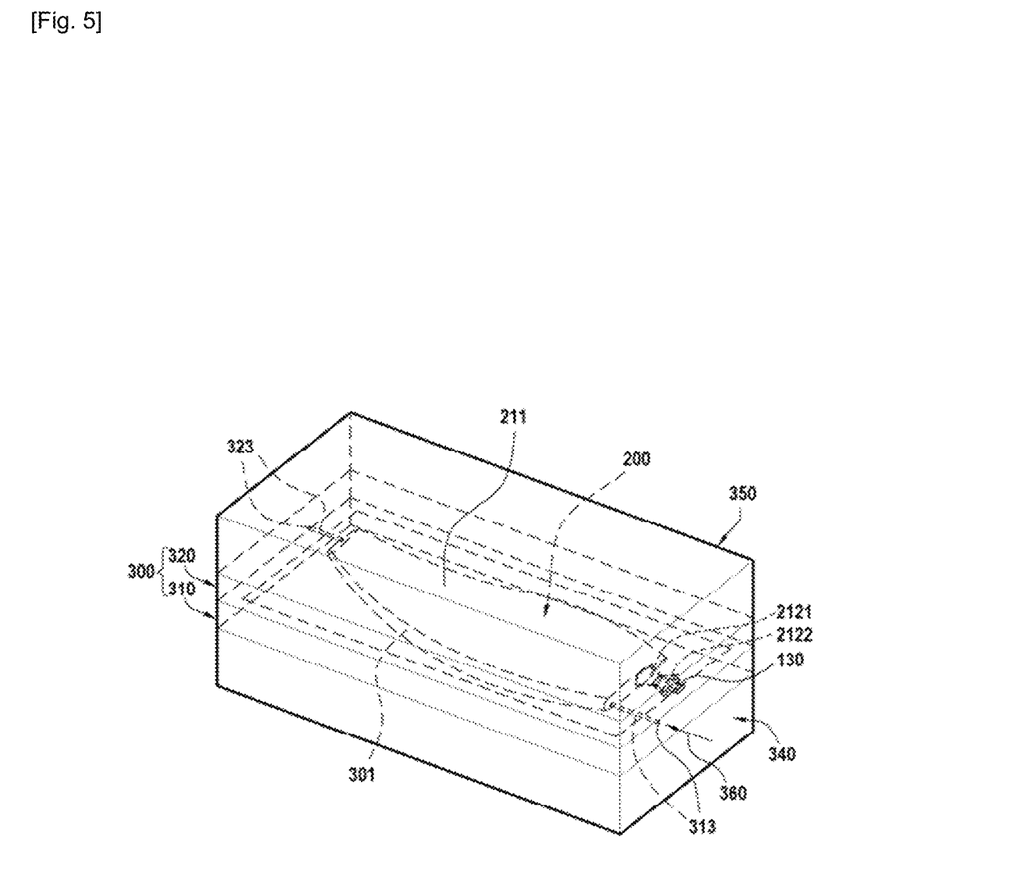
FIG. 5 is a perspective schematic view showing the injection tool of FIG. 4 closed.

Once the tool 300 is closed as illustrated on FIG. 5, the first and second cavities 311 and 321, of the first and second shells 310 and 320 respectively, together define an inner volume 301 having the shape of the blade to be produced and in which the fiber preform 200 is placed. The fiber preform 200 can be compacted with the closing of the tool 300 in order to obtain a determined fiber content in the preform. In this case, a compaction pressure is applied to the shells 310 and 320, for example by means of a press. The compaction of the fiber preform can also be done in a separate tool before the introduction of the preform into the injection tool.

The tool 300 further comprises means for performing the injection of a liquid matrix precursor and the transformation of this precursor into a matrix. More precisely, in the example described here, the first shell 310 of the tool 300 comprises an injection port 313 intended to allow the injection of a liquid matrix precursor blend into the fiber preform while the second shell comprises an evacuation port 323 intended to interact with a pumping system for vacuuming the tool and drawing in air during the injection. The injection tool 300 also comprises a lower part 340 and an upper part 350 between which the first and second shells 310 and 320 are placed, the lower part 340 and the upper part 350 being equipped with heating means (not shown on FIG. 5).

Once the tool 300 is closed, the blade is molded by impregnating the preform 200 with a thermosetting resin that is polymerized by heat treatment. For this purpose the well-known process of injection or transfer molding, so-called RTM (Resin Transfer Molding) is used. In accordance with the RTM process, a resin 360, for example a thermosetting resin, is injected via the injection port 313 of the first shell 310 into the internal volume occupied by the preform 200. The port 323 of the second shell 320 is connected to an evacuation duct kept under pressure (not shown on FIG. 5). This configuration allows the establishment of a pressure gradient between the lower part of the preform 200 where the resin is injected and the upper part of the preform located near the port 323. In this way, the resin 360 injected substantially level with the lower part of the preform will gradually impregnate the whole preform by circulating through it all the way to the evacuation port 323 through which the surplus is evacuated. Of course, the first and second shells 310 and 320 of the tool 300 may respectively comprise several injection ports and several evacuation ports.

The resin used can, for example, be an epoxy resin of 180° C. temperature class (maximum temperature withstood with no loss of characteristics). Resins suitable for the RTM process are well known. They preferably have low viscosity to facilitate their injection into the fibers. The choice of the temperature class and/or chemical nature of the resin is determined according to the thermomechanical stresses to which the part is to be subjected. Once the resin is injected into the entire reinforcement, it is polymerized by heat treatment as per the RTM process.

After injection and polymerization, the blade is unmolded. Finally, the blade is trimmed to remove excess resin and the chamfers are machined. No other machining is necessary since the part, being molded, complies with the required dimensions.

The densification methods described above are used mainly to produce, from the fiber preform of the invention, blades or propeller airfoils made of organic matrix composite (OMC), carbon matrix (C/C) and ceramic matrix composite (CMC) material.

Figure 6:
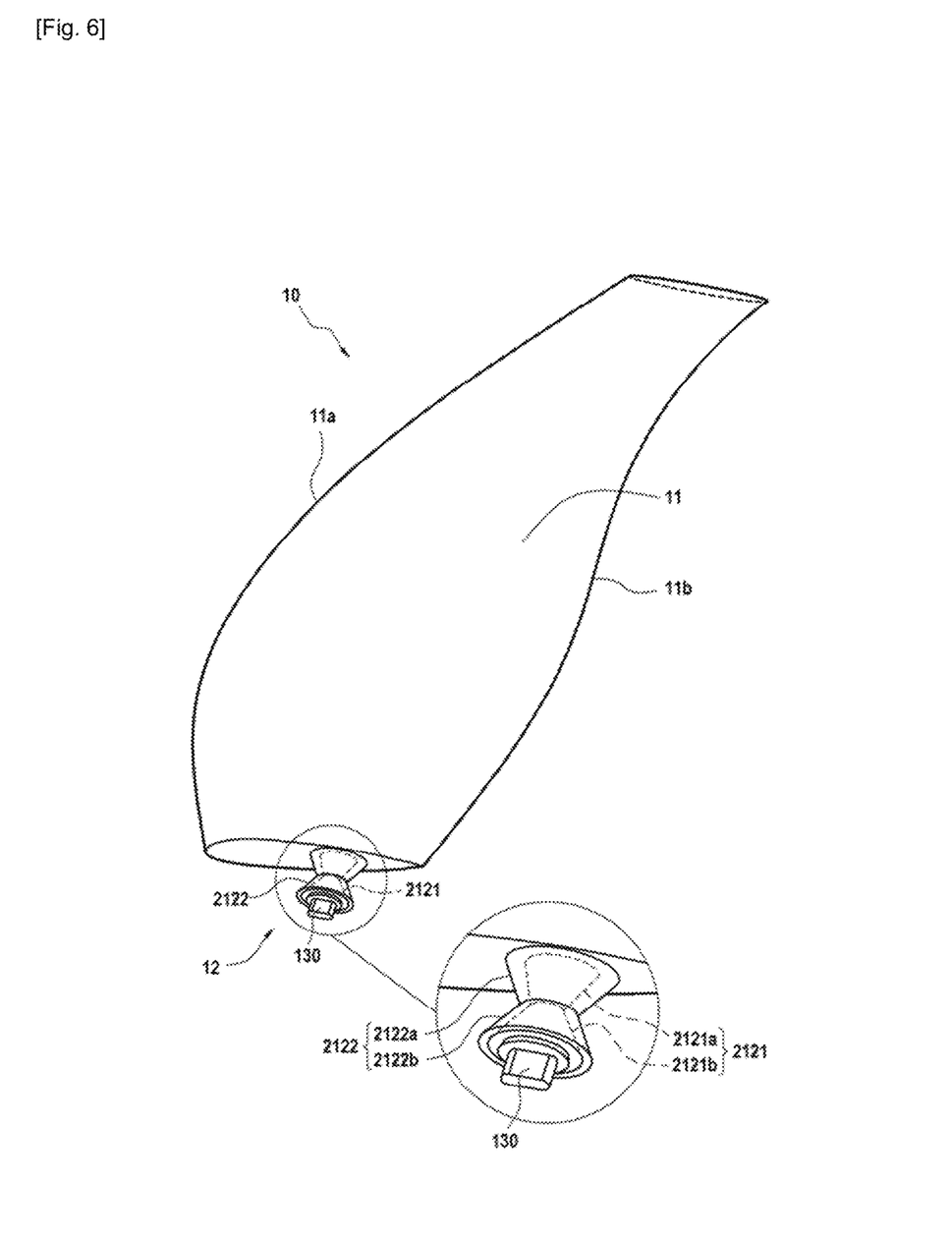
FIG. 6 is a perspective schematic view of a blade made of composite material obtained in accordance with an embodiment of the invention.

As illustrated on FIG. 6, a blade 10 is obtained, formed of a fiber reinforcement densified by a matrix which includes in its lower part a root 12 formed by the root preform part 212 of the fiber preform 200 and an airfoil 11 formed by the airfoil preform part 211 of the fiber preform 200. The blade 10 includes a leading edge 11*a* and a trailing edge 11*b* corresponding respectively to the leading edge 211*a* and trailing edge 211*b* parts of the fiber preform 200. The root 12 has a bulb shape, the root preform part 212 comprising two skins 2121 and 2122 wound around the insertion element 130 with first skin parts 2121*a* and 2122*a* forming a half-turn around the insertion element and second skin parts 2121*b* and 2122*b* forming a full turn around the insertion element. The blade 10 thus comprises a root 12 which has an axisymmetric compact shape suitable for incorporation into a propeller rotation or pitch change system.

The invention claimed is:

1. A method for manufacturing a turboprop engine blade or propeller airfoil made of composite material comprising a fiber reinforcement densified by a matrix, the method comprising:
producing by three-dimensional weaving of a fiber blank made as a single piece, the fiber blank having a flat shape extending along a longitudinal direction and a transverse direction respectively corresponding to the span direction and to the chord direction of the blade or propeller airfoil to be manufactured, the fiber blank comprising a root part and an aerodynamic profile part extending along the longitudinal direction from its the root part and along the transverse direction between a leading edge portion and a trailing edge portion,
shaping the fiber blank to obtain a fiber preform as a single piece having said aerodynamic profile part forming an aerodynamic profile preform and said root part forming a root preform, and
densifying the fiber preform by a matrix to obtain the blade or propeller airfoil made of composite material having the fiber reinforcement consisting of the fiber preform and densified by the matrix, and forming a single piece with an integrated root, wherein the root part of the fiber blank comprises a non-interlinking extending along a plane parallel to the surface of the fiber blank over the whole root part, said non-interlinking separating the root part into two woven portions and wherein the shaping of the fiber blank comprises the winding of each woven portion around an insertion element in such a way as to form the root preform part.

2. The method as claimed in claim 1, wherein each woven portion comprises a first part extending along the longitudinal direction from the aerodynamic profile part and a second part extending along the longitudinal direction from the first part, the second part having, along the transverse direction, a width greater than the width of the first part.

3. The method as claimed in claim 2, wherein the second part of each woven portion has, along the transverse direction, a width equivalent to at least half of the circumference of the part of the insertion element around which said second part of each woven portion is wound.

4. The method as claimed in claim 1, wherein the insertion element is composed of a fiber material chosen from among one of the following fiber materials: three-dimensional weaves, unidirectional laminates and fiber mat, or is composed of a metallic material.

5. A turboprop engine blade or propeller airfoil made of composite material comprising a fiber reinforcement densified by a matrix, the blade or propeller airfoil including, along a longitudinal direction, a root and an aerodynamic profile, the fiber reinforcement comprising a fiber preform having a three-dimensional weave with a root preform part located in the root and an aerodynamic profile part located in the aerodynamic profile, the root and aerodynamic profile preform parts being connected to one another by three-dimensional weaving, wherein the root preform part comprises a non-interlinking separating said root preform part into two woven skins wound around an insertion element.

6. The blade or propeller airfoil as claimed in claim 5, wherein each skin comprises a first part extending along the longitudinal direction from the aerodynamic profile preform part and a second part extending along the longitudinal direction from the first part, the second part of each skin being wound around at least half of the circumference of the part of the insertion element around which said second part of each woven portion is wound.

7. The blade or propeller airfoil as claimed in claim 5, wherein the insertion element is composed of a fiber material chosen from among the following fiber materials: three-dimensional weaves, unidirectional laminates and fiber mats, or is composed of a metallic material.

8. An aeronautical engine comprising a plurality of blades or propeller airfoils as claimed in claim 5.

9. An aircraft comprising at least one engine as claimed in claim 8.

* * * * *

UNITED STATES PATENT AND TRADEMARK OFFICE
CERTIFICATE OF CORRECTION

| | | |
|---|---|---|
| PATENT NO. | : 12,427,741 B2 | Page 1 of 1 |
| APPLICATION NO. | : 18/860295 | |
| DATED | : September 30, 2025 | |
| INVENTOR(S) | : Pierre Jean Faivre D'arcier et al. | |

It is certified that error appears in the above-identified patent and that said Letters Patent is hereby corrected as shown below:

In the Claims

In Claim 1, Column 8, the paragraph starting at Line 6 and ending at Line 15 should read as follows: producing by three-dimensional weaving of a fiber blank made as a single piece, the fiber blank having a shape extending along a longitudinal direction and a transverse direction respectively corresponding to the span direction and to the chord direction of the blade or propeller airfoil to be manufactured, the fiber blank comprising a root part and an aerodynamic profile part extending along the longitudinal direction from the root part and along the transverse direction between a leading edge portion and a trailing edge portion, Signed and Sealed this
Twenty-eighth Day of October, 2025

John A. Squires
*Director of the United States Patent and Trademark Office*